(12) United States Patent
Ward et al.

(10) Patent No.: US 8,451,750 B2
(45) Date of Patent: May 28, 2013

(54) VALIDATION OF ROUTES ADVERTISED BY BORDER GATEWAY PROTOCOL

(75) Inventors: David Delano Ward, Somerset, WI (US); Pradosh Mohapatra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/243,767

(22) Filed: Oct. 1, 2008

(65) Prior Publication Data

US 2010/0080131 A1    Apr. 1, 2010

(51) Int. Cl.
*H04L 3/14* (2006.01)
*H04L 12/56* (2006.01)

(52) U.S. Cl.
USPC .......................................... 370/254

(58) Field of Classification Search
USPC ............ 370/217, 242, 248, 392, 393, 395.53, 370/395.2, 389, 351, 386, 397, 399, 395.3, 370/395.31, 395.32, 395.54, 400–402
See application file for complete search history.

(56) References Cited

U.S. PATENT DOCUMENTS

| | | | | |
|---|---|---|---|---|
| 6,728,782 | B1 * | 4/2004 | D'Souza et al. | 709/242 |
| 2005/0135369 | A1 * | 6/2005 | Galand et al. | 370/392 |
| 2006/0153067 | A1 * | 7/2006 | Vasseur et al. | 370/217 |
| 2008/0062891 | A1 * | 3/2008 | Van der Merwe et al. | 370/254 |

OTHER PUBLICATIONS

Charles Lynn, Secure BGP (S-BGP) Jun. 2003, IETF.*
James, "Extensions to BGP to Support Secure Origin BGP (soBGP)", Apr. 2004, Cisco Systems.*
Lynn et al., "Secure BGP (S-BGP)," draft-clynn-s-bgp-protocol-01.txt, The Internet Society, Jun. 2003, 77 pages.
Lepinski et al., "A Profile for Route Origin Authorizations (ROAs)," draft-ietf-sidr-roa-format-03.txt, Internet Engineering Task Force, Jul. 7, 2008, 14 pages.
Huston & Michaelson, "Validation of Route Origination in BGP using the Resource Certificate PKI," draft-ietf-sidr-roa-validation-01.txt, Internet Engineering Task Force, Oct. 6, 2008, 13 pages.
Lonvick, "Radius Attributes for soBGP Support," draft-lonvick-sobgp-radius-04.txt, Internet Engineering Task Force, Feb. 13, 2004, 27 pages.
Ng, ed., "Extensions to BGP to Support Secure Origin BGP (soBGP)," draft-ng-sobgp-bgp-extensions-02.txt, Internet Engineering Task Force, Apr. 2004, 16 pages.
Weis, Ed., "Secure Origin BGP (soBGP) Certificates," draft-weis-sobgp-certificates-04.txt, Internet Engineering Task Force, Feb. 2006, 45 pages.

(Continued)

*Primary Examiner* — Kevin C Harper
*Assistant Examiner* — Samina Choudhry
(74) *Attorney, Agent, or Firm* — The Law Office of Kirk D. Williams

(57) ABSTRACT

Disclosed are, inter alia, methods, apparatus, computer-storage media, mechanisms, and means associated with validation of routes advertised by Border Gateway Protocol. One embodiment validates or invalidates a route received in a Border Gateway Protocol (BGP) update message. A route is validated in response to determining that the originating autonomous system specified in the AS_Path attribute for the route in a received BGP update message has authority to advertise the route and/or whether or not multiple autonomous systems identified in the AS_Path attribute of the update message is authorized to advertise the route, possibly in a particular order.

25 Claims, 8 Drawing Sheets

OTHER PUBLICATIONS

White, "Architecture and Deployment Considerations for Secure Origin BGP (soBGP)," draft-white-sobgp-architecture-02, Internet Engineering Task Force, Jun. 15, 2006, 21 pages.

White, ed., "Deployment Considerations for Secure Origin BGP (soBGP)," draft-white-sobgp-bgp-deployment-01.txt, Internet Engineering Task Force, Jun. 2003, 8 pages.

Heffernan, "Protection of BGP Sessions via the TCP MD5 Signature Option," RFC 2385, The Internet Society, Aug. 1998, 6 pages.

Lynn et al., "X.509 Extensions for IP Addresses and AS Identifiers," RFC 3779, The Internet Society, Jun. 2004, 27 pages.

Rekhter et al. eds., "A Border Gateway Protocol 4 (BGP-4)," RFC 4271, The Internet Society, Jan. 2006, 104 pages.

The Internet Protocol Journal, Ole J. Jacobsen, Ed., vol. 6, No. 3, Sep. 2003, 44 pages, available at http://www.cisco.com/web/about/ac123/ac147/archived_issues/ipj_6-3/index_html.

Stephen Kent et al., "Secure Border Gateway Protocol (S-BGP)," IEEE Journal on Selected Areas in Communications, vol. 18, Issue 4, Apr. 2000, pp. 582-592.

Karen Seo et al., "Public-key Infrastructure for the Secure Border Gateway Protocol (S-BGP)," DARPA Information Survivability Conference & Exposition II, 2001. DISCEX '01, Proceedings, vol. 1, Jun. 12-14, 2001, pp. 239-253.

Stephen Kent et al., "Design and Analysis of the Secure Border Gateway Protocol (S-BGP)," DARPA Information Survivability Conference & Exposition, 2000. DISCEX '00, Proceedings, vol. 1, Jan. 25-27, 2000, 16 pages.

Stephen Kent et al., "Secure Border Gateway Protocol (S-BGP)—Real World Performance and Deployment Issues", Proceedings of the IEEE Network and Distributed System Security Symposium, Feb. 2000, 14 pages.

* cited by examiner

VALIDATION OF ROUTES ADVERTISED BY BORDER GATEWAY PROTOCOL

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Border Gateway Protocol, BGP, allows the loop-free routing between autonomous systems (AS's). An AS is a set of routers under a single technical administration. Routers in an AS can use multiple Interior Gateway Protocols (IGPs) to exchange routing information inside the AS. The routers can use an exterior gateway protocol to route packets outside the AS. BGP uses Transport Control Protocol (TCP) as the transport protocol, on port 179. Two BGP routers form a TCP connection between one another and exchange network reachability information. This information is mainly an indication of the full paths that a route must take in order to reach the destination network. The paths are BGP AS numbers. This information helps in the construction of a graph of AS's that are loop-free. The graph also shows where to apply routing policies in order to enforce some restrictions on the routing behavior.

Any two routers that form a TCP connection in order to exchange BGP routing information are "peers" or "neighbors". BGP peers initially exchange the full BGP routing tables. After this exchange, the peers send incremental updates as the routing table changes. BGP as implemented in a typical packet switching device assumes that the received routing information can be trusted, which may not always be the correct assumption and can lead to routing problems.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
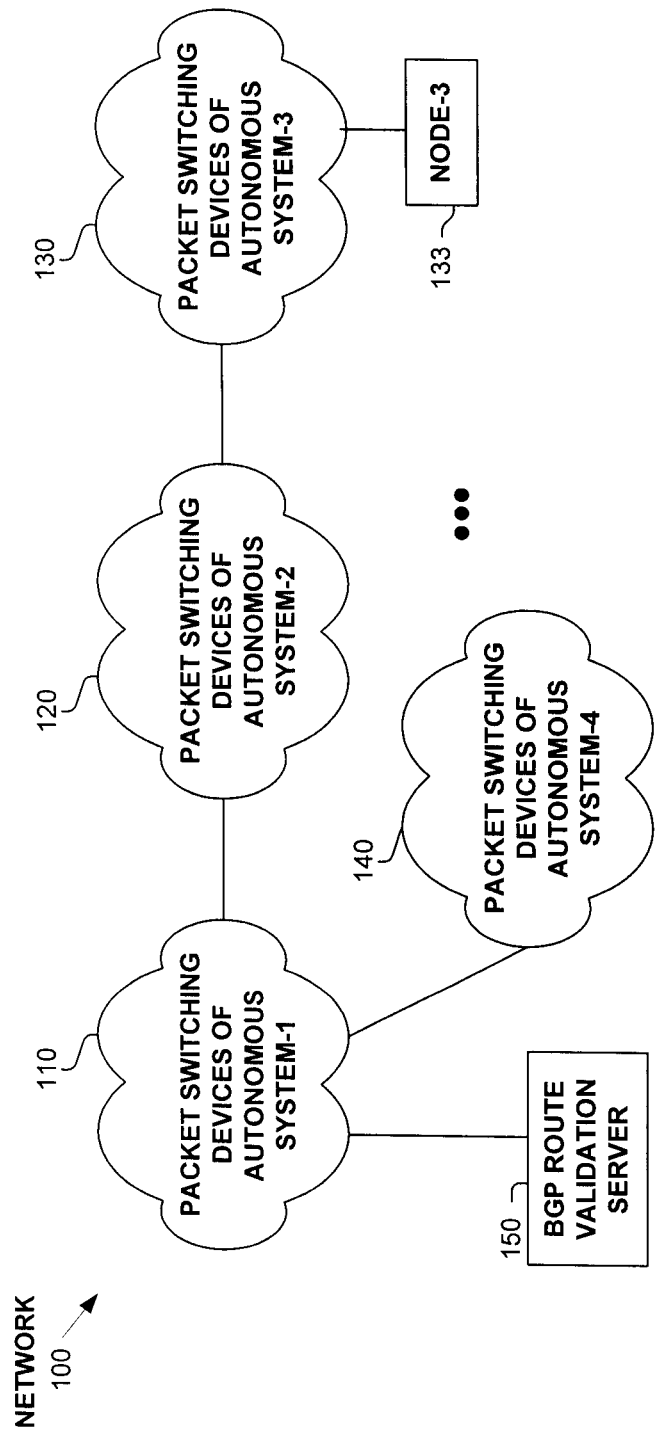
FIG. 1A illustrates a network operating according to one embodiment.

Disclosed are, inter alia, methods, apparatus, computer-storage media, mechanisms, and means associated with validation of routes advertised by Border Gateway Protocol. One embodiment validates or invalidates a route received in a Border Gateway Protocol (BGP) update message. In one embodiment, the route is validated in response to determining that the originating autonomous system specified in the AS_Path attribute for the route in a received BGP update message has authority to advertise the route; else the route is invalidated. In one embodiment, the route is validated in response to determining that each of multiple autonomous systems identified in the AS_Path attribute of the update message is authorized to advertise the route, possibly in a particular order. The router, in response to this validation, may propagate the route with a specific value identifying whether the route was validated or invalidated. In one embodiment, how invalidated routes are used and/or propagated by a router may be selectable.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with validation of routes advertised by Border Gateway Protocol. One embodiment includes an apparatus, comprising: one or more processors and memory, wherein said one or more processors are configured to perform operations. In one embodiment, said operations include: validating a route in response to determining that the originating autonomous system specified for the route in a received Border Gateway Protocol (BGP) update message has authority to advertise the route; and invalidating the route in response to determining that the originating autonomous system specified for the route in a received BGP update message does not have the authority to advertise the route; and adding a value to a BGP update packet for communication to another packet switching device explicitly identifying that either (a) the originating autonomous system was validated or (b) the originating autonomous system was invalidated.

In one embodiment, said another packet switching system is in a different autonomous system than the apparatus. In one embodiment, said another packet switching system is in a same autonomous system as the apparatus. In one embodiment, said operations include: validating the route in response to determining that each autonomous system of a plurality of autonomous systems listed in the AS_Path for the route in said received BGP update message is authorized to advertise the route, and invalidating the route in response to determining that at least one autonomous system of the plurality of autonomous systems listed in the AS_Path for the route in said received BGP update message is not authorized to advertise the route. In one embodiment, said operations include updating a routing database of the apparatus based on the route in response to said validation of the route. In one embodiment, the apparatus is configured to update the routing database of the apparatus based on the route; and subsequently, to perform said operation of validating the route and said updating of the routing database of the apparatus based on the route in response to said validation of the route.

In one embodiment, said operations include updating a routing database of the apparatus based on the route in response to said validation of the route. In one embodiment, the apparatus is configured to update the routing database of the apparatus based on the route; and subsequently, to perform said operation of validating the route and said updating of the routing database of the apparatus based on the route in response to said validation of the route. In one embodiment, said operations include: validating the route in response to determining that each autonomous system of a plurality of autonomous systems listed in the AS_Path for the route in said received BGP update message is authorized to advertise the route and the plurality of autonomous systems is listed in an authorized ordering of the plurality of autonomous systems, and invalidating the route in response to determining that at least one autonomous system of the plurality of autonomous systems listed in the AS_Path for the route in said received BGP update message is not authorized to advertise the route or the plurality of autonomous systems is not listed in an authorized ordering of the plurality of autonomous systems.

In one embodiment, said operations include: validating the route in response to determining that each autonomous system of a plurality of autonomous systems listed in the AS_Path for the route in said received BGP update message is authorized to advertise the route and the plurality of autonomous systems is listed in an authorized ordering of the plurality of autonomous systems specified for the route, and invalidating the route in response to determining that at least one autonomous system of the plurality of autonomous systems listed in the AS_Path for the route in said received BGP update message is not authorized to advertise the route or the plurality of autonomous systems is not listed in an authorized ordering of the plurality of autonomous systems specified for the route.

In one embodiment, the apparatus is configured to perform said validating and invalidating operations subsequent to nexthop validation of the route and prior to updating of a local preference attribute of the BGP update message. In one embodiment, the apparatus is configured to perform said validating and invalidating operations subsequent to nexthop validation of the route and prior to updating of a local preference attribute of the BGP update message, wherein the local preference attribute of the BGP update message is not affected by said validating and invalidating operations. In one embodiment, said operations include negotiating with said another packet switching device to determine to provide said another packet switching device with invalidated routing information.

One embodiment includes a method, comprising: validating a route in response to determining that each autonomous system of a plurality of autonomous systems listed in the AS_Path for the route in said received BGP update message is authorized to advertise the route and the plurality of autonomous systems is listed in an authorized ordering of the plurality of autonomous systems, and invalidating the route in response to determining that at least one autonomous system of the plurality of autonomous systems listed in the AS_Path for the route in said received BGP update message is not authorized to advertise the route or the plurality of autonomous systems is not listed in an authorized ordering of the plurality of autonomous systems. One embodiment comprises: updating a routing database for the route in response to said validating of the route. One embodiment comprises: adding a value to a BGP update packet for communication to another packet switching device explicitly identifying that either (a) the originating autonomous system was validated or (b) the originating autonomous system was invalidated.

One embodiment includes an apparatus, comprising: one or more processors and memory, wherein said one or more processors are configured to perform operations In one embodiment, said operations include: updating a routing data structure for a route, without performing its own validation of the route, in response to a received Border Gateway Protocol (BGP) update message including the route and an associated value specifying that the originating autonomous system for the route was validated by another packet switching device. In one embodiment, said received BGP update message includes a value specifying a trusted group of routers; and wherein the apparatus is configured to perform said operation of updating the routing data structure for the route without performing its own validation of the route in response to the value specifying the trusted group of routers. In one embodiment, the trusted group of routers is a BGP standardized community. In one embodiment, said operations comprise: validating a second route received in a second BGP update message including a value specifying that the originating autonomous system for the route was validated by a second packet switching device but the second packet switching device is not in a trusted group of routers. In one embodiment, the apparatus is configured to be responsive to a predetermined setting of whether or not to ignore route validations received from other routers. In one embodiment, the apparatus is configured to be responsive to a predetermined setting of whether or not to discard invalidated routes.

One embodiment includes an apparatus, comprising: means for validating a route in response to determining that the originating autonomous system specified for the route in a received Border Gateway Protocol (BGP) update message has authority to advertise the route and for invalidating the route in response to determining that the originating autonomous system specified for the route in a received BGP update message does not have the authority to advertise the route; and means for sending a BGP update packet to another packet switching device with the BGP update packet explicitly identifying that either (a) the originating autonomous system was validated or (b) the originating autonomous system was invalidated.

One embodiment includes: means validating a route in response to determining that each autonomous system of a plurality of autonomous systems listed in the AS_Path for the route in said received BGP update message is authorized to advertise the route and the plurality of autonomous systems is listed in an authorized ordering of the plurality of autonomous systems, and for invalidating the route in response to determining that at least one autonomous system of the plurality of autonomous systems listed in the AS_Path for the route in said received BGP update message is not authorized to advertise the route or the plurality of autonomous systems is not listed in an authorized ordering of the plurality of autonomous systems. One embodiment includes means for updating a routing database for the route in response to said validating of the route.

Expressly turning to the figures, FIG. 1A illustrates an example network 100, including four autonomous systems (AS's) 110, 120, 130 and 140. For the example of network 100, AS-3 (130) should advertise to AS-2 (120) a route to reach node-3 (133); and based on which, AS-2 (120) should advertise to AS-1 (110) a route to reach node-3 (133). Suppose, however, AS-4 140 also advertises a route to reach node 3 (133). It is quite possible that because AS-4 140 is directly connected to AS-1 (110), AS-1 (110) may select to route packets destined for node 3 (133) via AS-4 (140) as well as advertise a route for reaching node-3 (130) is via AS-4 (140). However, according to example network 100, this would be a wrong result as there is no path from AS-1 (110) to node-3 (130) via AS-4 (140).

Therefore, one embodiment uses BGP route validation server 150 to provide a source of which autonomous systems have been authorized, or possibly which have not been authorized, to originally advertise particular routes. One embodiment uses BGP route validation server 150 to provide a source of which autonomous systems have been authorized, or possibly which have not been authorized, to advertise particular routes; and one embodiment provides such autonomous systems in one or more ordered lists of autonomous systems authorized to advertise particular routes in the specified order (e.g., this order is a required order in the AS_Path attribute). In one embodiment, route validation server 150 is programmed with routes and corresponding autonomous system information as allocated by an Internet Address registry (e.g., IANA, ARIN, RIPE NCC, etc.). In one embodiment, this information is augmented based on trusted AS's, which are allowed to advertise specified routes. In one embodiment, route validation server 150 is used to provide a local copy to a router. In one embodiment, route validation server 150 responds to specific queries for a particular router and returns the authorized originating AS. In one embodiment, route validation server 150 responds to specific queries for a particular router and returns a list, unordered or possibly ordered, of AS's authorized to advertise for the route. In one embodiment, a router maintains a cache of information received from route validation server 150. In one embodiment, the number of route validation servers used in a network is extensible. One embodiment uses a secure communication mechanism to communicate the information between a router and route validation server 150, such as, but not limited to a secure tunnel, using a Resource Public Key Infrastructure (RPKI) (e.g., using X.509 resource certificates), etc.

Figure 1B:
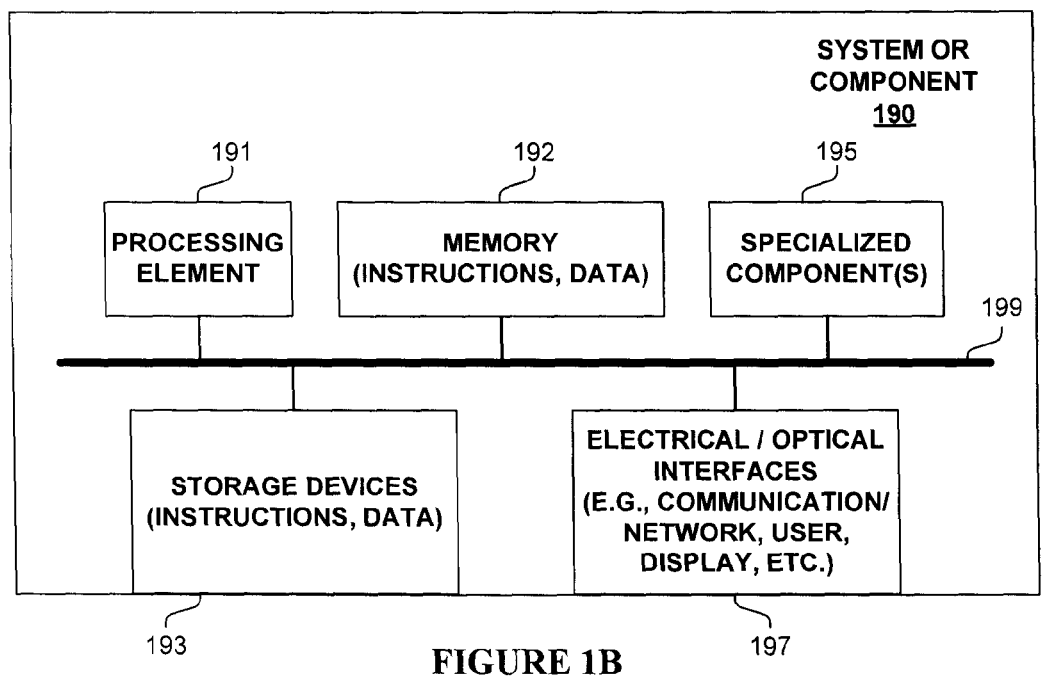
FIG. 1B illustrates an example system or component used in one embodiment.

FIG. 1B is block diagram of a system or component 190 used in one embodiment associated with validation of routes advertised by Border Gateway Protocol. In one embodiment, system or component 190 is included in a router to perform route processing, including performing route validation for routes received in BGP messages. In one embodiment, system or component 190 performs one or more processes corresponding to one of the flow diagrams illustrated or otherwise described herein.

In one embodiment, system or component 190 includes a processing element 191, memory 192, storage devices 193, specialized components 195 (e.g. optimized hardware such as for performing lookup/matching/validation operations, etc.), and interface(s) 197 for communicating information (e.g., sending and receiving packets, user-interfaces, displaying information, etc.), which are typically communicatively coupled via one or more communications mechanisms 199, with the communications paths typically tailored to meet the needs of the application. In one embodiment system or component 190 corresponds to, or is part of, a node, router or other packet switching device within network 100 of FIG. 1A.

Various embodiments of component 190 may include more or less elements. The operation of component 190 is typically controlled by processing element 191 using memory 192 and storage devices 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element 191 and/or data which is manipulated by processing element 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element 191 and/or data which is manipulated by processing element 191 for implementing functionality in accordance with an embodiment.

Figure 2:
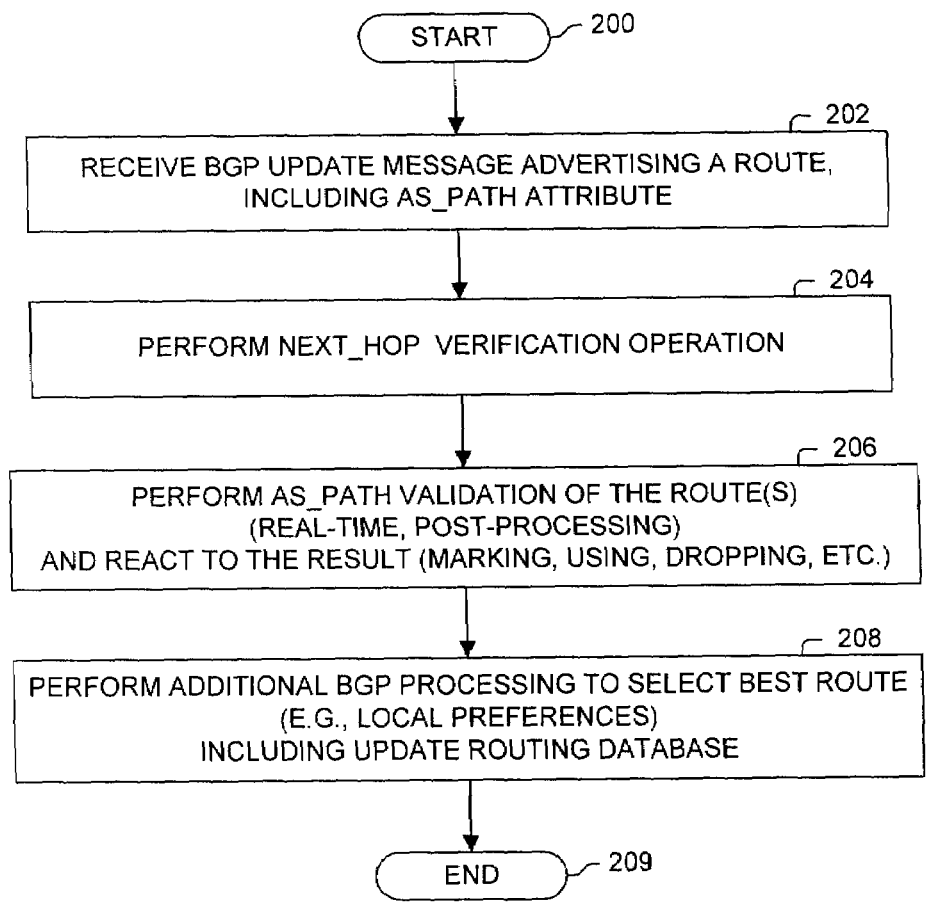
FIG. 2 illustrates a process performed in one embodiment.

FIG. 2 illustrates a process used in one embodiment. Processing begins with process block 200. In process block 202, a BGP update message is received, with the message advertising a route and including an AS_Path attribute. Note, a BGP update message can include multiple routes. The processing of "a route" is typically described herein, with such teachings applicable to each of these routes received or transmitted in a BGP update message.

Next, in process block 204, the standard next_hop verification process is performed. Next, in process block 206, the AS_Path validation is performed for the originating AS of the route and/or all AS's authorized to advertise the route, possibly in ordered lists of AS's (e.g., the advertisement must be in a particular sequential order of AS's for the route). In one embodiment, this validation of each route is performed in real-time. However, as this validation consumes resources and takes time, one embodiment initially assumes that each route is validated and is processed as such. Subsequently, the AS_Path validation process of each of these routes is performed, with the router updated according to the validation/invalidation of the routes. Note, additional details of this validation is described herein, including in relation to the flow diagrams of FIGS. 3A-C and 4. In process block 208, the standard additional BGP processing to select a best route (e.g., local preferences, AS_Path length, etc.) is performed. Processing of the flow diagram of FIG. 2 is complete as indicated by process block 209.

Figure 3A:
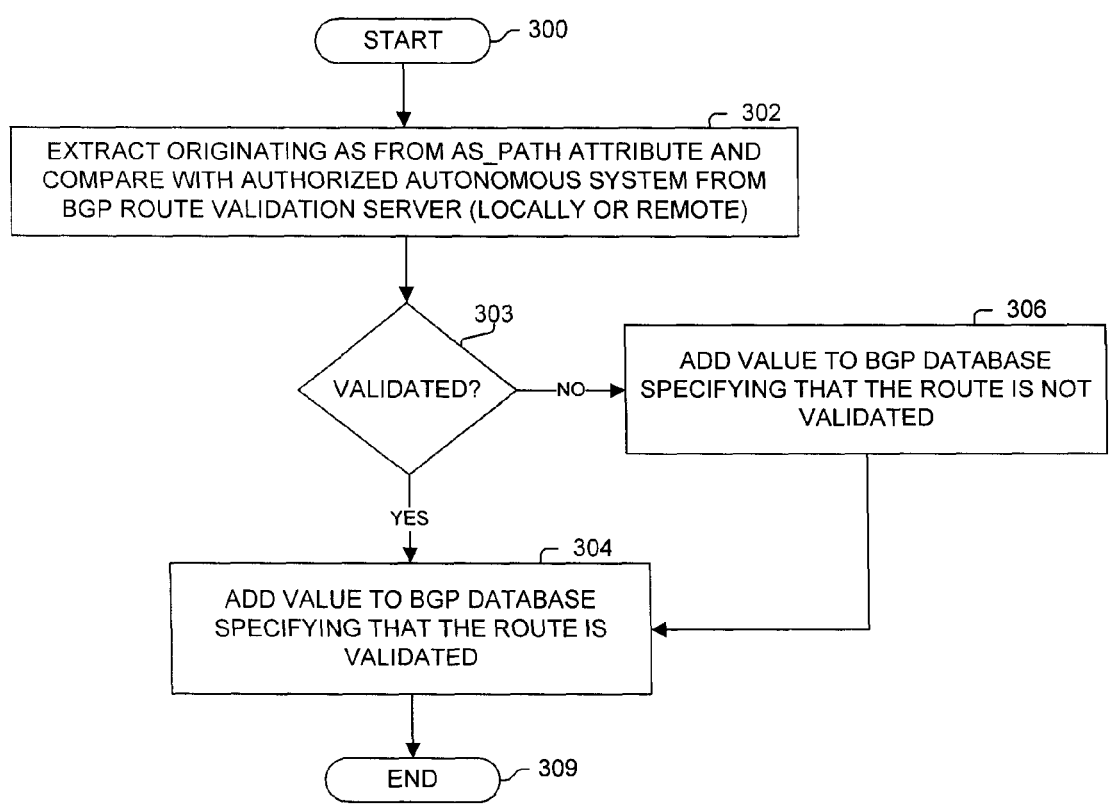
FIG. 3A illustrates a process performed in one embodiment.

FIG. 3A illustrates a process used in one embodiment. Processing begins with process block 300. In process block 302, the originating AS is extracted from the AS_Path attribute, and compared with the route's authorized AS from a BGP route validation server (e.g., locally or remotely). As determined in process block 303, if the route is validated (e.g., the authorized AS matches the extracted originating AS), then in process block 304, a value is added to the BGP database specifying that the route has been validated; otherwise, in process block 306, a value is added to the BGP database specifying that the route has been determined to be invalidated. Processing of the flow diagram of FIG. 3A is complete as indicated by process block 309.

Figure 3B:
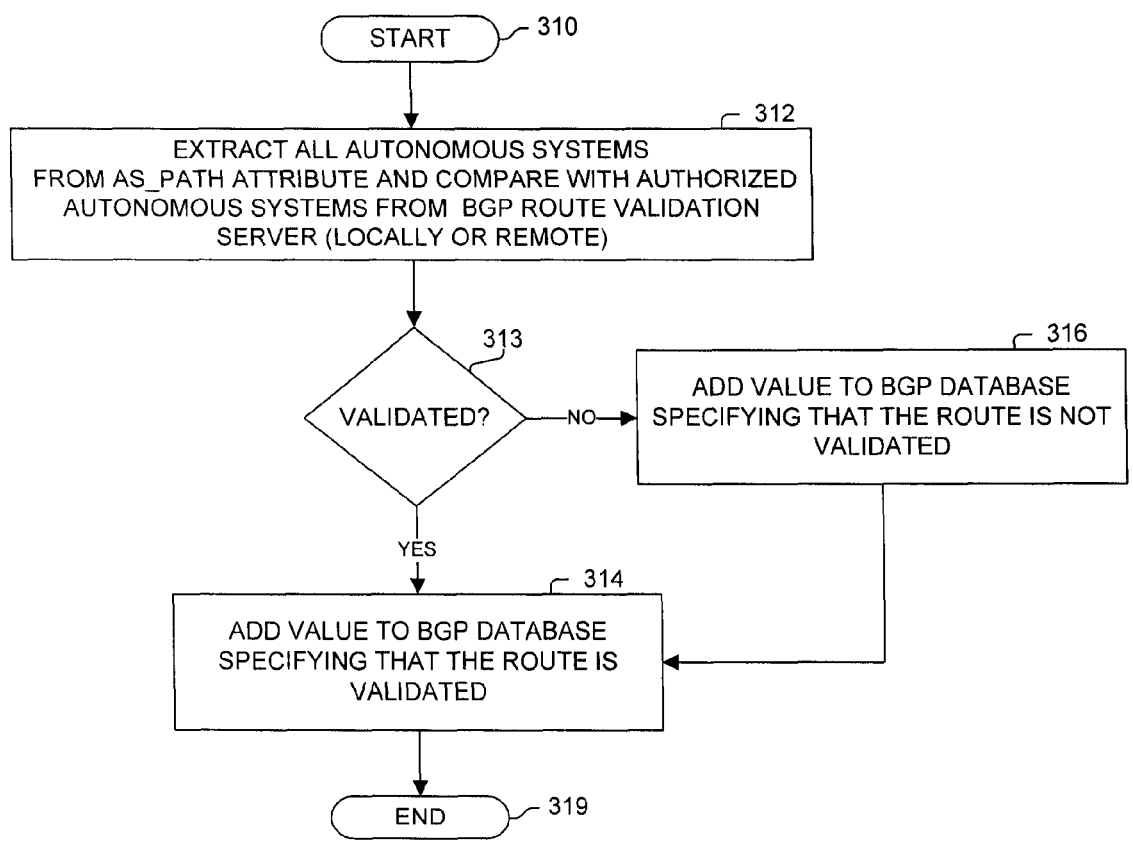
FIG. 3B illustrates a process performed in one embodiment.

FIG. 3B illustrates a process used in one embodiment. Processing begins with process block 310. In process block 312, all AS's are extracted from the AS_Path attribute, and compared with the route's authorized AS's from a BGP route validation server (e.g., locally or remotely). As determined in process block 313, if the route is validated (e.g., all extracted AS's are authorized to advertise the route), then in process block 314, a value is added to the BGP database specifying that the route has been validated; otherwise, in process block 316, a value is added to the BGP database specifying that the route has been determined to be invalidated. Processing of the flow diagram of FIG. 3B is complete as indicated by process block 319.

Figure 3C:
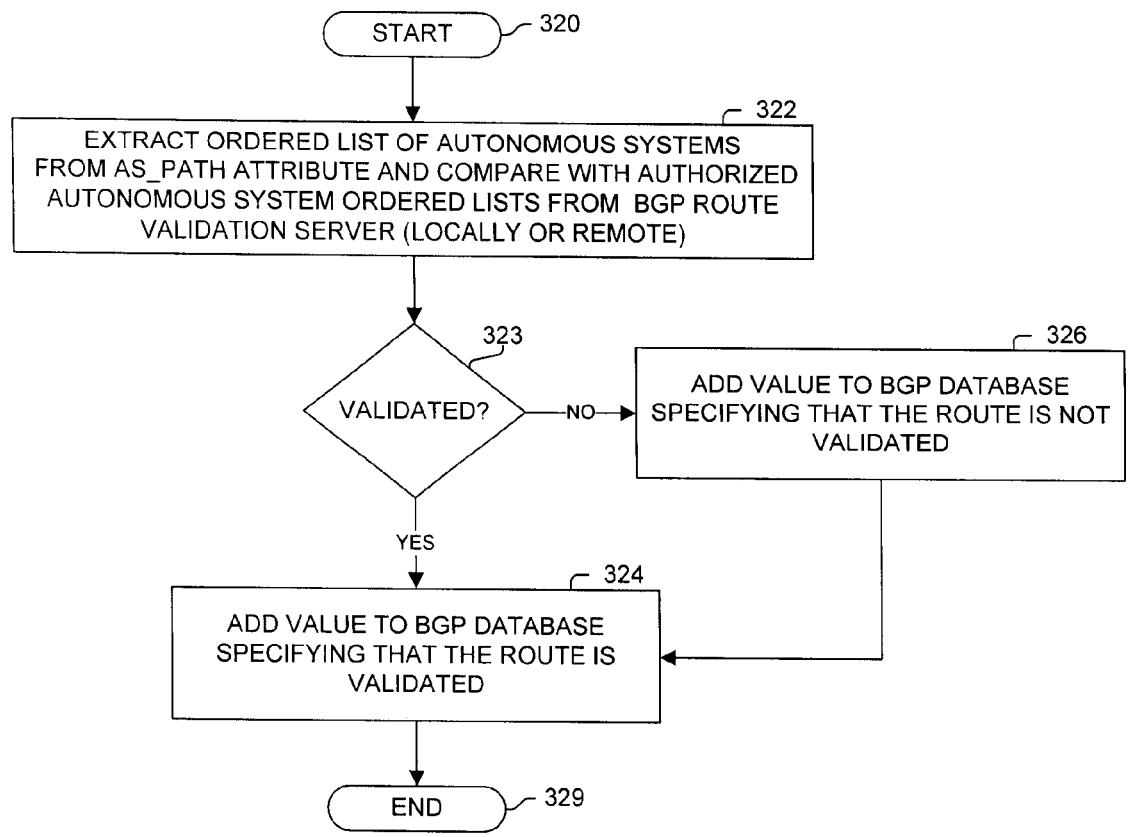
FIG. 3C illustrates a process performed in one embodiment.

FIG. 3C illustrates a process used in one embodiment. Processing begins with process block 320. In process block 322, the ordered list of AS's is extracted from the AS_Path attribute, and compared with the route's authorized ordered list(s) of AS's from a BGP route validation server (e.g., locally or remotely). As determined in process block 323, if the route is validated (e.g., all extracted AS's are authorized to advertise the route in the order listed in the AS_Path attribute), then in process block 324, a value is added to the BGP database specifying that the route has been validated; otherwise, in process block 326, a value is added to the BGP database specifying that the route has been determined to be invalidated. Processing of the flow diagram of FIG. 3C is complete as indicated by process block 329.

Figure 4:
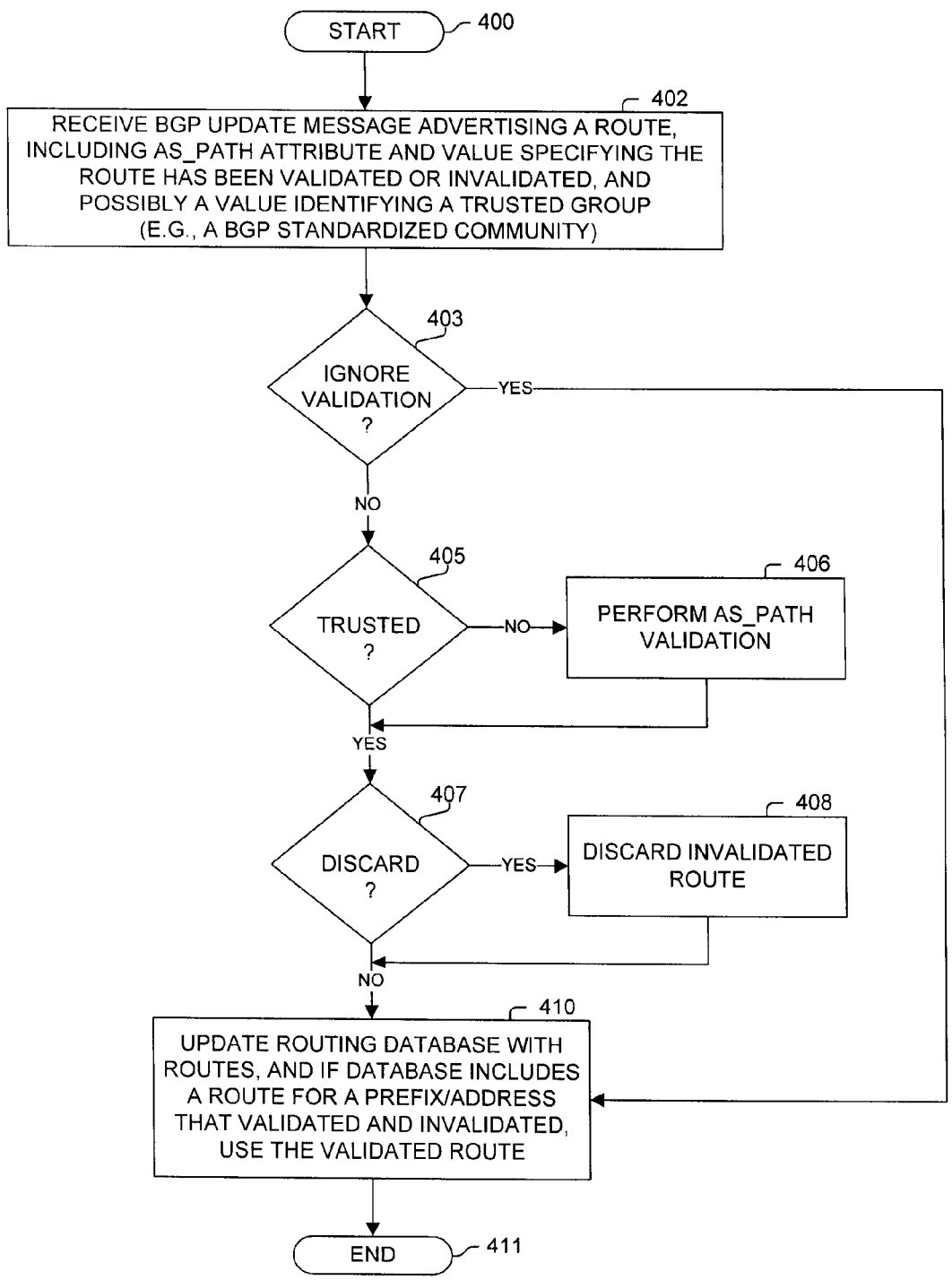
FIG. 4 illustrates a process performed in one embodiment.

FIG. 4 illustrates a process used in one embodiment. It may be desirable to have multiple, selectable levels of validation. One embodiment includes an "ignore" state, which is typically used as a default mode of operation in network as this is the behavior in current networks without validation capability. This behavior essentially ignores the validation check and accept all prefixes (e.g., all paths are considered as being validated). One embodiment includes a "prefer" state, which causes a router to select a validated path for a route over an invalidated path for the route during the best-path selection process. In one embodiment, if an invalidated path is the only path for a prefix, the invalidated prefix will be announced, typically with a value specifying that the path was invalidated. One embodiment includes a "discard" state, which causes a router to mark the invalidated paths as being inaccessible, similar to the BGP next-hop validation process. Thus, none of the invalidated paths will be considered in best-path selection, with the effect that, if a prefix has a single path that is invalidated, the prefix will typically not be announced. In one embodiment, a validated prefix is always preferred over an invalidated one irrespective of its other attributes. In one embodiment, the selectable level of validation may be on a per-neighbor basis, such as within a same autonomous system or within a same community, standardized community, extended community, or other indication of a group of trusted or not trusted routers or autonomous systems, etc. In other words, if a neighbor is trusted, the router receiving the BGP update message may forgo the validation process and directly accept the validation performed by the trusted neighbor. In one embodiment, the level of validation also affects the outbound behavior, such as by advertising only validated routes, etc.

Returning to the flow diagram of FIG. 4, processing begins with process block 400. In process block 402, a BGP update message is received that advertises a route including an AS_Path attribute, a value specifying whether the route was validated or invalidated by another device, and possibly a trusted group identifier (e.g., BGP standardized community) of the validating device. As determined in process block 403, if the validation is to be ignored (e.g., the route is to be used regardless of whether it is validated or invalidated), then processing proceeds to process block 410. Otherwise, as determined in process block 405, if the BGP update message was not received from a trusted source, then in process block 406, the route is validated based on the originating AS and/or multiple AS's in the AS_Path. As determined in process block 407, if the route information should be discarded as the route was invalidated and the state is set to discard invalidated routes, then in process block 408, the route is discarded, such as by, but not limited to, marking as inaccessible. In process block 410, the routing database is updated to reflect the route and whether or not it was validated or invalidated, for use in determining the best route for routing packets. Processing of the flow diagram of FIG. 4 is complete as indicated by process block 411.

Figure 5:
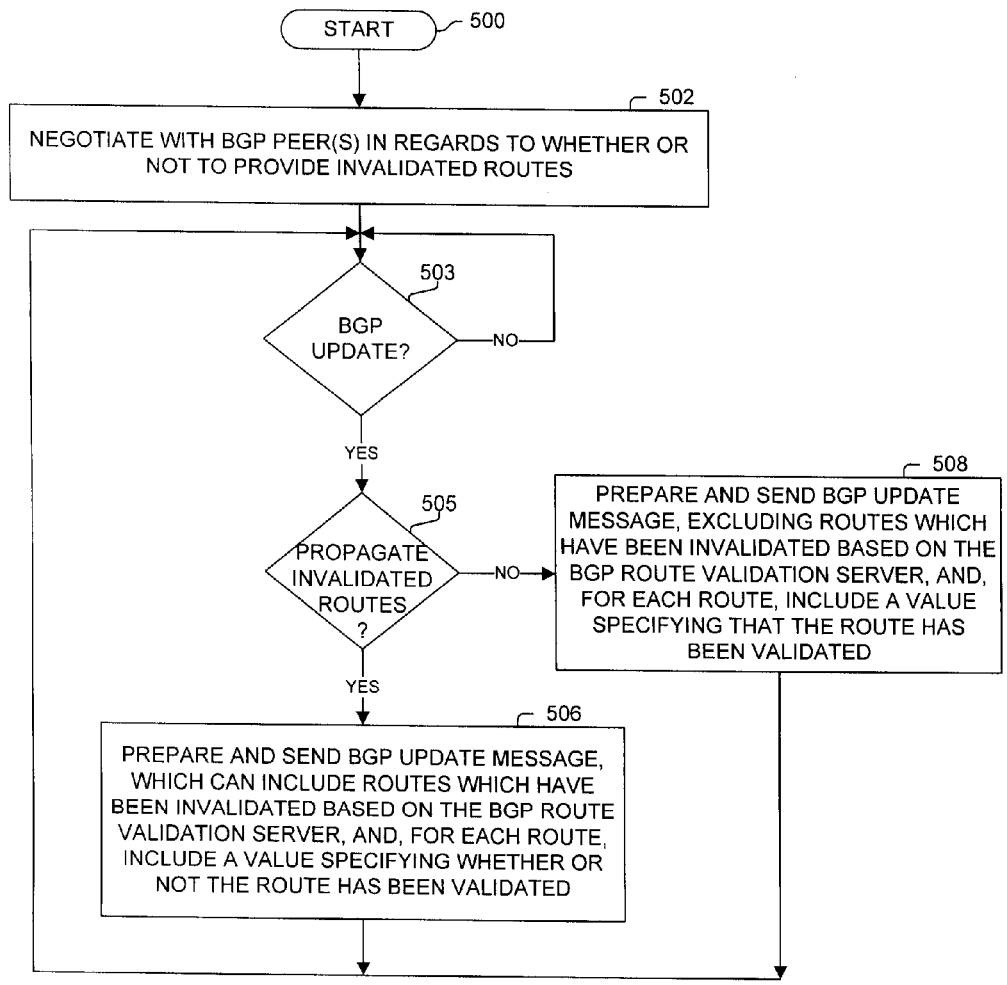
FIG. 5 illustrates a process performed in one embodiment.

FIG. 5 illustrates a process used in one embodiment. Processing begins with process block 500. In process block 502, a negotiation is performed with the router's BGP peers to determine whether or not invalidated routes should be forwarded to the peer. Until a BGP update message is ready to be sent by the router, processing loops at process block 503. In response to a condition to update a BGP peer, if invalidated routes are to be propagated as determined in process block 505, then in process block 506, one or more BGP update messages are prepared and sent, which may include both validated and invalidated routes with the routes being marked accordingly (i.e., with a value identifying whether they were found to be validated or invalidated). Otherwise, in process block 508, one or more BGP update messages are prepared and sent, which do not include invalidated routes, typically with the routes being marked accordingly (i.e., with a value identifying they were validated). Processing returns to process block 503.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switching device, comprising:
one or more processors; and
memory;
wherein said one or more processors are configured to perform operations, with said operations including:
validation processing including: validating a route in response to determining that the originating autonomous system specified for the route in a received Border Gateway Protocol (BGP) update message has authority to advertise the route; and invalidating the route in response to determining that the originating autonomous system specified for the route in a received BGP update message does not have the authority to advertise the route;
adding a value to a particular BGP update packet for communication to another packet switching device, wherein a first value of the value explicitly identifies that the originating autonomous system was validated, and wherein a second value of the value explicitly identifies that the originating autonomous system was invalidated; and
sending the particular BGP update packet, with said added value, to said another packet switching device;
wherein the BGP update message is received by the packet switching device from a BGP peer device; and
wherein said received BGP update message includes an advertisement of the route from the BGP peer device.

2. The packet switching device of claim 1, wherein said another packet switching system is in a different autonomous system than the apparatus.

3. The packet switching device of claim 1, wherein said another packet switching system is in a same autonomous system as the apparatus.

4. The packet switching device of claim 1, wherein said operations include: validating the route in response to determining that each autonomous system of a plurality of autonomous systems listed in the AS_Path for the route in said received BGP update message is authorized to advertise the route, and invalidating the route in response to determining that at least one autonomous system of the plurality of autonomous systems listed in the AS_Path for the route in said received BGP update message is not authorized to advertise the route.

5. The packet switching device of claim 4, wherein said operations include updating a routing database of the apparatus based on the route in response to said validation of the route.

6. The packet switching device of claim 4, wherein the apparatus is configured to update the routing database of the apparatus based on the route; and subsequently, to perform said operation of validating the route and said updating of the routing database of the apparatus based on the route in response to said validation of the route.

7. The packet switching device of claim 1, wherein said operations include updating a routing database of the apparatus based on the route in response to said validation of the route.

8. The packet switching device of claim 1, wherein the apparatus is configured to update the routing database of the apparatus based on the route; and subsequently, to perform said operation of validating the route and said updating of the routing database of the apparatus based on the route in response to said validation of the route.

9. The packet switching device of claim 1, wherein said operations include: validating the route in response to determining that each autonomous system of a plurality of autonomous systems listed in the AS_Path for the route in said received BGP update message is authorized to advertise the route and the plurality of autonomous systems is listed in an authorized ordering of the plurality of autonomous systems, and invalidating the route in response to determining that the plurality of autonomous systems is not listed in an authorized ordering of the plurality of autonomous systems.

10. The packet switching device of claim 1, wherein the apparatus is configured to perform said validating and invalidating operations subsequent to nexthop validation of the route and prior to updating of a local preference attribute of the BGP update message.

11. The packet switching device of claim 1, wherein the apparatus is configured to perform said validating and invalidating operations subsequent to nexthop validation of the route and prior to updating of a local preference attribute of the BGP update message, wherein the local preference attribute of the BGP update message is not affected by said validating and invalidating operations.

12. The packet switching device of claim 1, wherein said operations include negotiating with said another packet switching device to determine to provide said another packet switching device with invalidated routing information.

13. A method, comprising:
receiving, by a packet switching device, a BGP update message from a BGP peer device, with said received BGP update message including an advertisement of a route from the BGP peer device;
invalidating, by the packet switching device, the route in response to determining that the route was advertised in one or more invalid manners; and
adding a value to a particular BGP update packet for communication to another packet switching device that the route was invalidated; and
sending the particular BGP update packet to said another packet switching device.

14. The method of claim 13, wherein said one or more invalid manners includes at least one autonomous system of a plurality of autonomous systems listed in the AS_Path for the route in said received BGP update message is not authorized to advertise the route.

15. The method of claim 13, wherein said one or more invalid manners includes the AS_Path specifies a plurality of autonomous systems, but the plurality of autonomous systems is not listed in an authorized ordering.

16. The packet switching device of claim 1, wherein the value said added to the particular BGP update packet explicitly identifies that the originating autonomous system was invalidated.

17. A method, comprising:
receiving, by a packet switching device, a Border Gateway Protocol (BGP) update message from a BGP peer device, wherein said received BGP update message includes an advertisement of the route from the BGP peer device;
performing, by the packet switching device, validation processing, including in response to determining that the originating autonomous system specified for the route in said received BGP update message has authority to advertise the route: validating the route, else invalidating the route;
including, by the packet switching device, a value to a particular BGP update packet for communication to another packet switching device, wherein a first value of the value explicitly identifies that the originating autonomous system was validated, and wherein a second value of the value explicitly identifies that the originating autonomous system was invalidated; and
sending, by the packet switching device, the particular BGP update packet to said another packet switching device.

18. The method of claim 17, wherein the value said included in the particular BGP update packet explicitly identifies that the originating autonomous system was invalidated.

19. A packet switching device, comprising:
one or more processors; and
memory;
wherein said one or more processors are configured to perform operations, with said operations including:
in response to receiving a BGP update message from a BGP peer device, with said received BGP update message including an advertisement of a route from the BGP peer device: invalidating the route in response to determining that the route was advertised in one or more invalid manners; and
adding a value to a particular BGP update packet for communication to another packet switching device that the route was invalidated;
wherein the particular BGP update packet, with said added value, is sent to said another packet switching device.

20. The packet switching device of claim 19, wherein said one or more invalid manners includes at least one autonomous system of a plurality of autonomous systems listed in the AS_Path for the route in said received BGP update message is not authorized to advertise the route.

21. The packet switching device of claim 19, wherein said one or more invalid manners includes the AS_Path specifies a plurality of autonomous systems, but the plurality of autonomous systems is not listed in an authorized ordering.

22. The packet switching device of claim 19, wherein said operations include: updating a routing database to include an identification of said invalidation of the route.

23. The packet switching device of claim 1, wherein said operations include: updating a routing database to include an identification of said invalidation of the route.

24. The method of claim 13, including: updating a routing database to include an identification of said invalidation of the route.

25. The method of claim 17, including: updating a routing database to include an identification of said invalidation of the route.

* * * * *